United States Patent
Kwak et al.

(10) Patent No.: US 10,558,014 B2
(45) Date of Patent: Feb. 11, 2020

(54) OPTICAL LENS ASSEMBLY AND METHOD OF FORMING IMAGE USING THE SAME

(71) Applicant: Samsung Electronics Co., Ltd., Gyeonggi-do (KR)

(72) Inventors: Ho-keun Kwak, Seoul (KR); Jung-pa Seo, Gyeonggi-do (KR); Byung-kwon Kang, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/840,369

(22) Filed: Dec. 13, 2017

(65) Prior Publication Data

US 2018/0164544 A1 Jun. 14, 2018

(30) Foreign Application Priority Data

Dec. 14, 2016 (KR) .................. 10-2016-0170414

(51) Int. Cl.
| | | |
|---|---|---|
| *G02B 13/00* | (2006.01) | |
| *G02B 9/04* | (2006.01) | |
| *G02B 9/12* | (2006.01) | |
| *G02B 9/60* | (2006.01) | |
| *G02B 1/04* | (2006.01) | |

(52) U.S. Cl.
CPC ............ *G02B 13/003* (2013.01); *G02B 9/04* (2013.01); *G02B 9/12* (2013.01); *G02B 9/60* (2013.01); *G02B 13/0035* (2013.01); *G02B 13/0045* (2013.01); *G02B 1/041* (2013.01)

(58) Field of Classification Search
CPC ...... G02B 13/0045; G02B 9/60; G02B 13/18; G02B 15/173; G02B 27/0025; G02B 3/04; G02B 27/646; G02B 13/0015; G02B 13/006; G02B 15/14; G02B 13/00; G02B 13/001; G02B 5/005; G02B 5/208;
(Continued)

(56) References Cited

U.S. PATENT DOCUMENTS

| | | |
|---|---|---|
| 5,559,638 A | 9/1996 | Aoki et al. |
| 5,646,788 A | 7/1997 | Bietry |

(Continued)

FOREIGN PATENT DOCUMENTS

| | | |
|---|---|---|
| EP | 1 387 198 A1 | 2/2004 |
| EP | 2 148 233 A1 | 1/2010 |

(Continued)

OTHER PUBLICATIONS

International Search Report dated Mar. 27, 2018.
European Search Report dated Oct. 25, 2019.

*Primary Examiner* — Evan P Dzierzynski
*Assistant Examiner* — Sharrief I Broome
(74) *Attorney, Agent, or Firm* — Cha + Reiter, LLC.

(57) ABSTRACT

Provided are an optical lens assembly and a method of forming an image. The optical lens assembly includes: a first lens having a convex object-side surface; a second lens having a convex object-side surface; at least one lens at an image side of the second lens; a first stop being a variable stop at an object side of the first lens; and a second stop at an image side of the first lens, wherein the second stop determines a minimum F number, and the first stop is variable to determine an F number greater than the minimum F number.

13 Claims, 8 Drawing Sheets

(58) Field of Classification Search
CPC .. G02B 13/004; G02B 13/009; G02B 13/143; G02B 13/16; G02B 1/041; G02B 7/08
See application file for complete search history.

(56) References Cited

U.S. PATENT DOCUMENTS

| | | |
|---|---|---|
| 9,632,215 B2 | 4/2017 | Son |
| 2011/0273611 A1* | 11/2011 | Matsusaka ......... G02B 13/0045 348/345 |
| 2013/0135751 A1* | 5/2013 | Atsuumi ................ G02B 15/14 359/683 |
| 2015/0109684 A1* | 4/2015 | Son .................... G02B 13/0045 359/713 |
| 2016/0161719 A1 | 6/2016 | Son |

FOREIGN PATENT DOCUMENTS

| | | |
|---|---|---|
| JP | 1995-43606 A | 2/1995 |
| JP | 2006-309043 A | 11/2006 |
| JP | 2010-96820 A | 4/2010 |
| JP | 5245706 B2 | 7/2013 |
| JP | 2014-153575 A | 8/2014 |
| JP | 2015-129869 A | 7/2015 |
| KR | 10-1504035 B1 | 3/2015 |

* cited by examiner

OPTICAL LENS ASSEMBLY AND METHOD OF FORMING IMAGE USING THE SAME

CLAIM OF PRIORITY

This application claims the benefit of Korean Patent Application No. 10-2016-0170414, filed on Dec. 14, 2016, in the Korean Intellectual Property Office, the disclosure of which is incorporated herein in its entirety by reference.

BACKGROUND

1. Field

The present disclosure generally relates to an optical lens assembly and a method of forming an image using the optical lens assembly. More particularly, the present disclosure relates to an optical lens assembly having high resolution under high-illumination conditions and capable of forming bright images under low-illumination conditions, and a method of forming such images using the optical lens assembly.

2. Description of the Related Art

Electronic apparatuses that exist in the art provide various services and functions. For example, electronic apparatuses such as mobile devices or user devices may provide various services using various sensor modules, and may provide photographic services or video services. Along with the increasing use of electronic apparatuses, the use of cameras operatively connected to electronic apparatuses has also gradually increased. This increasing use has caused improvements in the performance and/or resolution of cameras of electronic apparatuses. Photographs of various landscapes or people, or selfies may be taken using these cameras of electronic apparatuses. In addition, the captured photographs or videos may be shared through social network sites or other media.

For photographing devices that are included in mobile devices, such as cellular phones, laptop computers, tablet personal computers (PC), smartwatches, or drones, users increasingly desire to capture bright images under low-illumination conditions. Therefore, there is an increasing need for a lens having short and compact structure for portability, a wide field of view, and a low F number.

SUMMARY

In recent years, there has been large increasing demand for small camera modules for portable terminals, and along with this, image sensors used in camera modules, such as a charge-coupled device (CCD) or a complementary metal oxide semiconductor (CMOS) image sensor, have to be designed to have high pixel density. Optical lens assemblies used in small camera modules of portable terminals are required to have high optical performance for use with such high pixel image sensors to guarantee high image quality. In the related art, most optical lens assemblies used in small camera modules of portable terminals are generally of a fixed stop type having a low F number. Such optical systems of a fixed stop type having a low F number make it possible to effectively improve image brightness under low-illumination conditions, but may have poor resolution under high-illumination conditions because of coma aberration.

Various embodiments may provide optical lens assemblies that may be used, for example, in electronic apparatuses (such as portable terminals) to obtain bright images under low-illumination conditions and high-resolution images under high-illumination conditions.

In addition, various embodiments may provide methods of forming bright images under low-illumination conditions and high-resolution images under high-illumination conditions.

Additional aspects will be set forth in part in the description which follows and, in part, will be apparent from the description, or may be learned by practice of the presented embodiments.

To solve the above-described problems or other problems, for example, an optical lens assembly according to an embodiment may include: a first lens having a convex object-side surface; a second lens having a convex object-side surface; at least one lens at an image side of the second lens; a first stop being a variable stop at an object side of the first lens; and a second stop between an image side of the first stop and the at least one lens at the image side of the second lens, wherein the second stop may determine a minimum F number, and the first stop may be variable to determine an F number greater than the minimum F number, wherein the optical lens assembly may satisfy the following conditions:

$$\frac{|d2|}{|sag1|} \leq 0.9 \quad \langle \text{Conditions} \rangle$$

$$0.2 \leq \frac{R1}{f} \leq 0.8$$

where sag1 denotes a sag value of the object-side surface of the first lens measured based on an effective diameter at the minimum F number, d2 denotes a distance measured from a vertex of the object-side surface of the first lens to the first stop along an optical axis, R1 denotes a radius of curvature of the object-side surface of the first lens, and f denotes a total focal length of the optical lens assembly.

To solve the above-described problems or other problems, for example, an optical lens assembly according to an embodiment may include: at least five lenses arranged between an object and an image plane; a variable stop provided at an object side of a lens closest to the object among the at least five lenses; and a fixed stop provided between an image side of the variable stop and an image-side surface of a third lens from the object, wherein the fixed stop may determine a first F number for a maximum aperture, and the variable stop may be moved to adjust a second F number greater than the first F number, wherein, during a focusing operation, the variable stop and the fixed stop may be moved together with the at least five lenses.

To solve the above-described problems or other problems, for example, a method of forming an image according to an embodiment may be performed using an optical lens assembly including a plurality of lenses, and the method may include: allowing a first lens closest to an object among the plurality of lenses to receive light; adjusting a first F number by moving a first stop provided at an object side of the first lens; determining a second F number for a maximum aperture by using a second stop provided between an image side of the first stop and an image-side surface of a third lens from the object among the plurality of lenses; and adjusting an amount of the received light by using the first and second stops.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
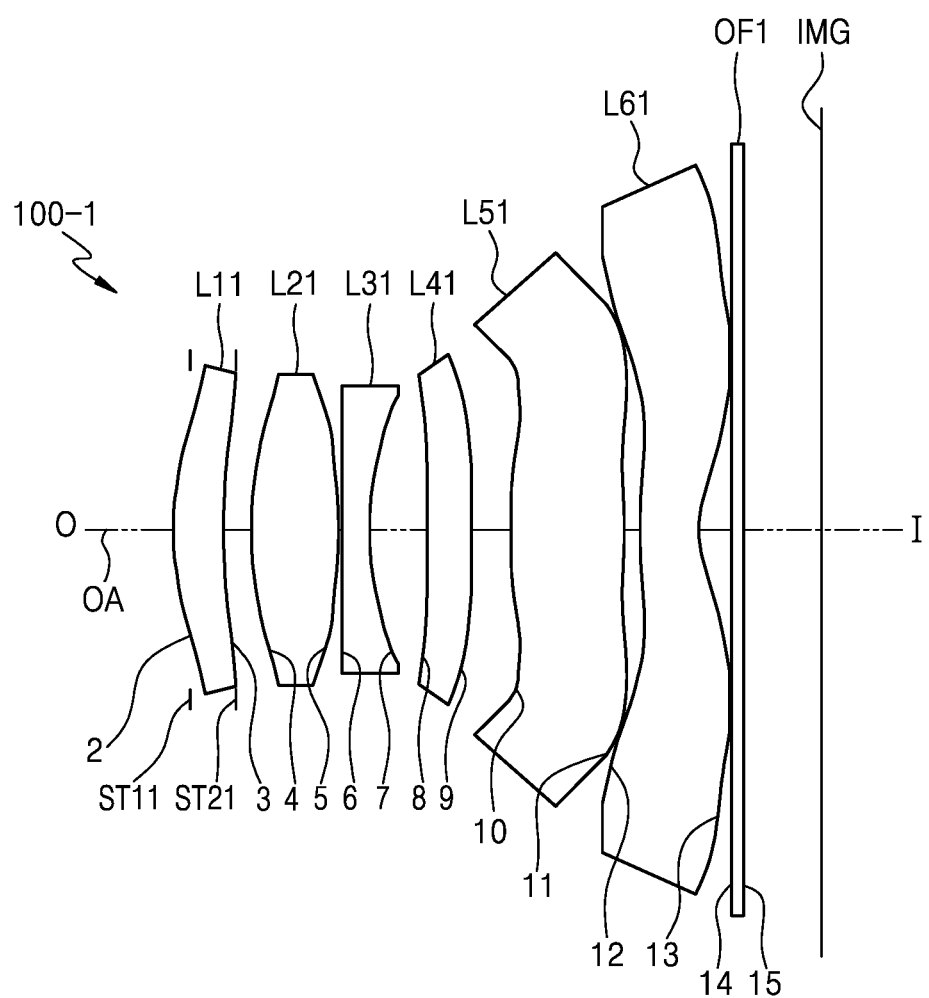
FIG. 1 illustrates an optical lens assembly of a first numerical embodiment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments. In describing the drawings, similar reference numerals may be used to designate similar constituent elements.

As used herein, the expressions "have," "may have," "include," or "may include" refer to the existence of a corresponding feature (e.g., numeral, function, operation, or constituent element, such as component), and do not exclude one or more additional features.

In the present disclosure, the expressions "A or B," "at least one of A and/or B," and "one or more of A and/or B" may include all possible combinations of the items listed. For example, the expressions "A or B," "at least one of A and B," or "at least one of A or B" refer to all of (1) including at least A, (2) including at least B, and (3) including all of at least A and at least B.

Expressions, such as "a first," "a second," "the first," or "the second," used herein may modify various elements regardless of the order and/or the importance of the elements. Such expressions are used to distinguish one element from other elements, but do not limit the corresponding elements. For example, a first user device and a second user device may indicate different user devices regardless of the order or importance of the user devices. For example, a first element may be referred to as a second element, and similarly, a second element may be referred to as a first element without departing from the scope of the present disclosure.

It should be understood that when an element (e.g., first element) is referred to as being (operatively or communicatively) "coupled," or "connected," to another element (e.g., second element), the first element may be coupled or connected directly to the second element or any other element (e.g., third element) may be interposed between the two elements. In contrast, it may be understood that when an element (e.g., first element) is referred to as being "directly coupled," or "directly connected" to another element (second element), there are no element (e.g., third element) interposed between the two elements.

The expression "configured to" used herein may be exchanged with, for example, "suitable for," "having the capacity to," "designed to," "adapted to," "made to," or "capable of" according to the situation. The expression "configured to" does not necessarily imply "specifically designed to" in hardware. Alternatively, in some situations, the expression "device configured to" may mean that the device, together with other devices or components, "is able to." For example, the phrase "processor configured (or adapted) to perform A, B, and C" may refer to a dedicated processor (e.g. an embedded processor) only for performing the corresponding operations or a generic-purpose processor (e.g., a central processing unit (CPU) or application processor (AP)) that can perform the corresponding operations by executing one or more software programs stored in a memory device.

Terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the same meanings as the contextual meanings in the relevant field of art, and are not to be interpreted to have excessively formal meanings unless clearly defined herein. In some cases, even a term defined in the present disclosure should not be interpreted as a meaning of excluding some embodiments.

An electronic apparatus, according to various embodiments, may include at least one of a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, or a wearable device. According to various embodiments, the wearable device may include at least one of an accessory type (e.g., a watch, a ring, a bracelet, an anklet, a necklace, glasses, a contact lens, or a head-mounted device (HMD)), a fabric or clothing integrated type (e.g., electronic clothing), a body-mounted type (e.g., a skin pad, or tattoo), or a bio-implantable type (e.g., an implantable circuit).

According to some embodiments, the electronic apparatus may be a home appliance. The home appliance may include at least one of, for example, a television, a digital versatile disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, or an electronic photo frame.

According to another embodiment, the electronic apparatus may include at least one of various medical devices such as portable medical measuring devices (e.g., a blood glucose monitoring device, a heart rate monitoring device, a blood pressure measuring device, or a body temperature measuring device, a magnetic resonance angiography (MRA) machine, a magnetic resonance imaging (MRI) machine, a computed tomography (CT) machine, or an ultrasonic machine), a navigation device, a global navigation satellite system (GNSS), an event data recorder (EDR), a flight data recorder (FDR), a vehicle infotainment device, an electronic apparatus for a ship (e.g., a navigation device for a ship, and a gyro-compass), an avionics device, a security device, an automotive head unit, a robot for home or industry, an automatic teller's machine (ATM), a point of sales (POS) machine, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments, the electronic apparatus may include at least one of a part of furniture or a building/structure, an electronic board, an electronic signature receiving device, a projector, or various kinds of measuring instruments (e.g., a water meter, an electric meter, a gas meter, or a radio wave meter). The electronic apparatus, according to various embodiments, may be a combination of one or more of the aforementioned various devices. In some embodiments, the electronic apparatus may be a flexible device. Furthermore, the electronic apparatus is not limited to the aforementioned devices, and may include a new electronic apparatus according to the development of new techniques.

Hereinafter, electronic apparatuses will be described according to various embodiments with reference to the accompanying drawings. As used herein, the term "user" may indicate a person who uses an electronic apparatus or a device (e.g., an artificial intelligence electronic apparatus) that uses an electronic apparatus.

Hereinafter, optical lens assemblies and methods of forming images using the optical lens assemblies will be described according to various embodiments with reference to the accompanying drawings.

FIG. 1 illustrates an optical lens assembly 100-1 of a first numerical embodiment according to various embodiments.

According to various embodiments, the optical lens assembly 100-1 may include a first lens L11, a second lens L21, at least one lens at an image side I of the second lens L21, a first stop ST11 being a variable stop located at an object side O of the first lens L11, and a second stop ST21 located on an image side I of the first lens L11.

In the following descriptions of lenses, the term "image side" may refer to the side located in the direction toward an image plane IMG on which images are to be formed, and the term "object side" may refer to the side located in the direction toward an object whose image is to be captured. In addition, an "object-side surface" of a lens may refer to the surface of the lens facing the object and may be the left surface or entrance surface of the lens in the drawings, and an "image-side surface" of a lens may refer to the surface of the lens facing the image plane IMG and may be the right surface or exit surface of the lens in the drawings. For example, the image plane IMG may be a surface of an imaging device or an image sensor. For example, the image sensor may include a complementary metal oxide semiconductor (CMOS) image sensor or a sensor such as a charge-coupled device (CCD). However, the image sensor is not limited thereto. For example, the image sensor may be a device capable of converting images of objects into electrical image signals.

The first lens L11 may have a convex object-side surface 2, and the second lens L21 may have a convex object-side surface 4. According to various embodiments, the first lens L11 may have positive refractive power, and the second lens L21 may have positive refractive power. The first lens L11 may have a meniscus shape convex toward the object. For example, the second lens L21 may be a biconvex lens. According to various embodiments, the at least one lens at the image side I of the second lens L21 may include a third lens L31, a fourth lens L41, a fifth lens L51, and a sixth lens L61. For example, the third lens L31 may have negative refractive power, and the fourth lens L41 may have no refractive power. For example, the third lens L31 may have a meniscus shape convex toward the object. Aberration may be suppressed by placing the third lens L31 having negative refractive power on the image side I of the second lens L21.

For example, the fourth lens L41 may have a flat shape in a region of the object-side surface 8 near the optical axis OA and a flat shape in a region of the image-side surface 9 near the optical axis OA. The region near the optical axis OA may refer to a region located within a predetermined radius from the optical axis OA. However, the shape of the fourth lens L41 is not limited thereto. The fifth lens L51 may have positive refractive power, and the sixth lens L61 may have negative refractive power.

The fifth lens L51 may have at least one inflection point. For example, the fifth lens L51 may have a biconvex shape in a region near the optical axis OA (for example, a region between the first inflection point and the optical axis OA). For example, the term "inflection point" may refer to a point at which the sign of the radius of curvature of the lens surface changes from positive (+) to negative (−), or from negative (−) to positive (+). Alternatively, the term "reflection point" may refer to a point at which the shape of the lens surface changes from convex to concave, or from concave to convex. The term "radius of curvature" may refer to a value expressing the degree of curvature at each point of a curve or a curved surface.

The sixth lens L61 may have at least one inflection point on at least one of the object-side surface 12 and the image-side surface 13. The object-side surface 12 of the sixth lens L61 may be convex in a region near the optical axis OA and concave away from the optical axis OA. The image-side surface 13 of the sixth lens L61 may be concave in a region near the optical axis OA and convex away from the optical axis OA. The sixth lens L61 may have a meniscus shape convex toward the object in a region near the optical axis OA.

The first stop ST11 may be a variable stop, and the second stop ST21 may be a fixed stop. According to various embodiments, the second stop ST21 may determine the minimum F number of the optical lens assembly 100-1, and the first stop ST11 may be varied to determine an F number greater than the minimum F number. The second stop ST21 may determine a first F number for maximum aperture, and the first stop ST11 may be moved to adjust a second F number greater than the first F number. At the minimum F number, that is, in the brightest state of the optical lens assembly 100-1, only the second stop ST21 may serve as the stop. In other words, the second stop ST21 may determine the maximum effective diameter of the optical lens assembly 100-1, and the first stop ST11 may be varied to determine a diameter smaller than the maximum effective diameter.

According to various embodiments, for example, the optical lens assembly 100-1 may be used in a portable terminal and be a large diameter lens system having an F number of about 2.0 or less at the maximum aperture. The first stop ST11 functioning as the smaller stop may be located on the outer side of the optical lens assembly 100-1, and the second stop ST21 functioning as the maximum aperture stop may be located inside the optical lens assembly 100-1. Here, the outer side of the optical lens assembly 100-1 does not refer to a position between lenses of the optical lens assembly 100-1, but may refer to a position located on the object side O of the first lens L11 which is closest to the object. In addition, the inside of the optical lens assembly 100-1 may refer to a position between lenses of the optical lens assembly 100-1.

The first stop ST11 may be located at the object side O of the first lens L11 which is closest to the object. For example, the first stop ST11 may be located close to the object-side surface 2 of the first lens L11 to a degree not exceeding the sag value of the object-side surface 2. According to various embodiments, the second stop ST21 may be located between the first lens L11 and the second lens L21. For example, the second stop ST21 may be located on the image-side surface 3 of the first lens L11.

During a focusing operation in which the lenses of the optical lens assembly 100-1 are moved along the optical axis OA so that a focused image is incident on the image plane IMG, the first stop ST11 and the second stop ST21 may be moved together with the lenses. Therefore, it may not be necessary to separately include a motor for moving the lenses and a motor for moving the stops. As a result, the optical lens assembly 100-1 may have a small size.

According to various embodiments, at least one optical element OF1 may be between the sixth lens L61 and the image plane IMG. The optical element OF1 may include at least one of a low pass filter, an infrared (IR)-cut filter, or cover glass. For example, if the optical element OF1 is an IR-cut filter, visible light rays may pass through the optical element OF1 but infrared rays may not pass through the optical element OF1. Thus, infrared rays may not reach the image plane IMG. However, the optical lens assembly 100-1 may not include the optical element OF1.

According to various embodiments, the optical lens assembly 100-1 may include at least one aspheric lens in order to decrease astigmatic field curvature. For example, all the lenses of the optical lens assembly 100-1 may be aspheric lenses. Aspheric lenses having inflection points may decrease astigmatic field curvature.

In addition, according to various embodiments, the optical lens assembly 100-1 may include at least one plastic lens. According to various embodiments, the optical lens assembly 100-1 may include at least three plastic lenses. For example, all the lenses of the optical lens assembly 100-1 may be plastic lenses. As such, the weight of the optical lens assembly 100-1 may be reduced, and manufacturing costs of the optical lens assembly 100-1 may also be reduced.

Figure 3:
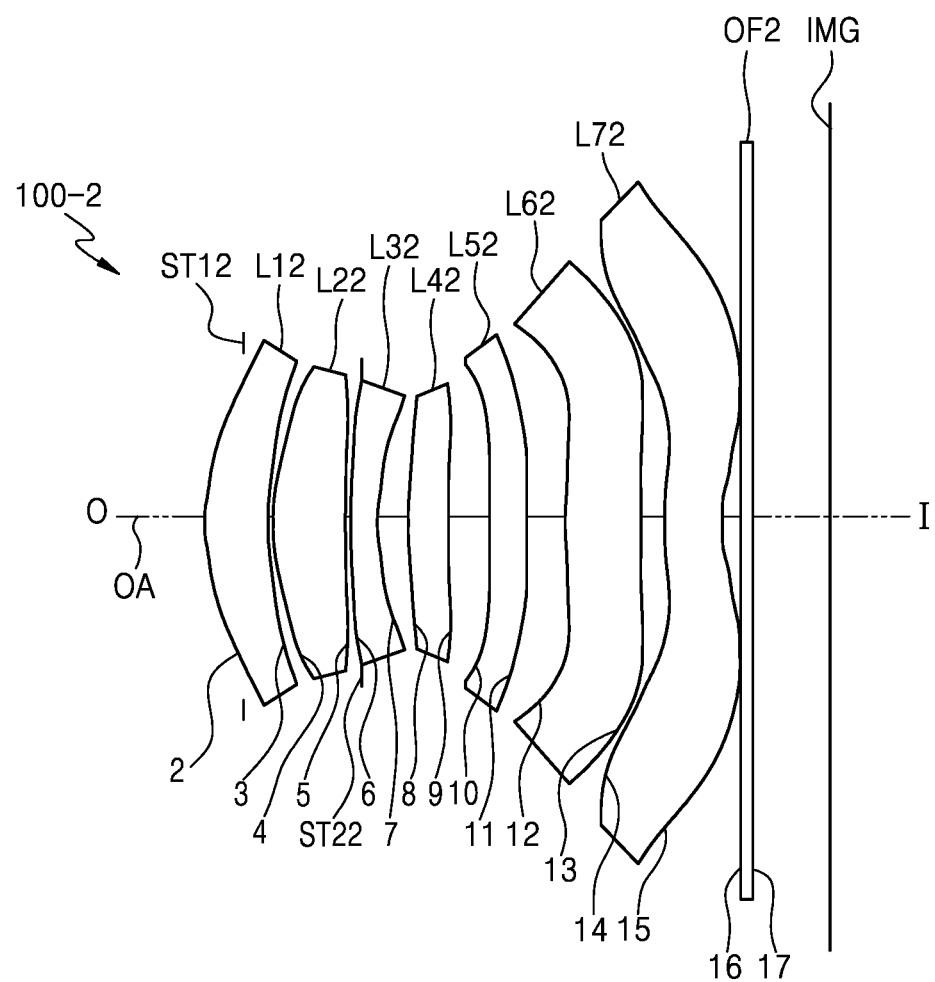
FIG. 3 illustrates an optical lens assembly of a second numerical embodiment according to various embodiments.

FIG. 3 illustrates an optical lens assembly 100-2 of a second numerical embodiment according to various embodiments.

According to various embodiments, the optical lens assembly 100-2 may include a first lens L12, a second lens L22, at least one lens at the image side I of the second lens L22, a first stop ST12 being a variable stop located at the object side O of the first lens L12, and a second stop ST22 located at the image side I of the first lens L12.

The first lens L12 may have a convex object-side surface 2, and the second lens L22 may have a convex object-side surface 4. According to various embodiments, the first lens L12 may have positive refractive power, and the second lens L21 may have positive refractive power. The first lens L12 may have a meniscus shape convex toward the object. For example, the second lens L22 may be a biconvex lens. According to various embodiments, the at least one lens at the image side I of the second lens L22 may include a third lens L32, a fourth lens L42, a fifth lens L52, a sixth lens L62, and a seventh lens L72. For example, the second lens L32 may have negative refractive power, and the fourth lens L42 may have positive refractive power. For example, the fifth lens L52 may have no refractive power. For example, the fifth lens L52 may have a flat object-side surface 10 and a flat image-side surface 11. In this case, the flat object-side surface 10 and the flat image-side surface 11 may be flat within the range of the effective diameter of the optical lens assembly 100-2. However, the shape of the fifth lens L52 is not limited thereto. The sixth lens L62 may have positive refractive power, and the seventh lens L72 may have negative refractive power.

The seventh lens L72 being closest to an image plane IMG may have at least one inflection point. For example, the object-side surface 14 of the seventh lens L72 may be convex in a region near an optical axis OA and concave away from the optical axis OA. The image-side surface 15 of the seventh lens L72 may be concave in a region near the optical axis OA and convex away from the optical axis OA. The seventh lens L72 may have a meniscus shape convex toward the object in a region near the optical axis OA.

The first stop ST12 may be a variable stop, and the second stop ST22 may be a fixed stop. The second stop ST22 may determine the maximum effective diameter of the optical lens assembly 100-2, and the first stop ST12 may be varied to determine a diameter smaller than the maximum effective diameter. In other words, the second stop ST22 may determine a first F number for a maximum aperture, and the first stop ST12 may be moved to adjust a second F number greater than the first F number.

The first stop ST12 may be located at the object side of the first lens L12 and be closest to the object. According to various embodiments, the second stop ST22 may be located between the second lens L22 and the third lens L32. For example, the second stop ST22 may be located on the image-side surface 6 of the third lens L32.

When the optical lens assembly 100-2 is focused, the first stop ST12 and the second stop S22 may be moved together with the lenses of the optical lens assembly 100-2. According to various embodiments, at least one optical element OF2 may be between the seventh lens L72 and an image plane IMG.

According to various embodiments, the optical lens assembly 100-2 may include at least one aspheric lens in order to decrease astigmatic field curvature. For example, all the lenses of the optical lens assembly 100-2 may be aspheric lenses.

In addition, according to various embodiments, the optical lens assembly 100-2 may include at least one plastic lens. For example, all the lenses of the optical lens assembly 100-2 may be plastic lenses.

In the optical lens assemblies of the various embodiments, a variable stop is located at an object side of a lens closest to an object, and a maximum aperture stop is located between lenses, thereby minimizing the size of the optical lens assembly. If the maximum aperture stop is located on the outer side of a lens optical system, the lens optical system may have excessive coma aberration. For this reason, according to the various embodiments, the variable stop serving as the smaller stop is located on the outer side of a lens system, and the fixed stop serving as the maximum aperture stop is located inside the lens system, thereby minimizing the coma aberration.

In addition, according to the various embodiments, when the optical lens assemblies are moved for focusing, the first and second stops are moved together with the optical lens assemblies, thereby reducing variations in peripheral light amount and the aberrations caused by such variations. Thus, optical performance may be maintained.

The optical lens assemblies of the various embodiments may satisfy the following conditions. The following conditions will be described with reference to the optical lens assembly 100-1 of the first numerical embodiment. However, the following conditions may be applied to other embodiments in the same manner.

$$\frac{|d2|}{|sag1|} \leq 0.9 \quad \langle\text{Condition 1}\rangle$$

$$0.2 \leq \frac{R1}{f} \leq 0.8 \quad \langle\text{Condition 2}\rangle$$

where sag1 denotes the sag value of the object-side surface 2 of the first lens L11 measured based on the effective diameter at the minimum F number, d2 denotes the distance measured from the vertex of the object-side surface 2 of the first lens L11 to the first stop ST11 along the optical axis OA, R1 denotes the radius of curvature of the object-side surface 2 of the first lens L11, and f denotes the total focal length of the optical lens assembly 100-1. sag1 may refer to the sag value measured from the effective diameter of the object-side surface 2 of the first lens L11 when the second stop ST21 is in a maximally opened state (that is, in the brightest state). In this case, the first stop ST11 is not further restricting the aperture of the lens assembly.

Condition 1 is for preventing the distance from the first stop ST11 to the object-side surface 2 of the first lens L11 from excessively exceeding the sag value of the object-side surface 2 of the first lens L11. If $$\frac{|d2|}{|sag1|}$$

exceeds the upper limit of Condition 1, the first stop ST11 may be too distant from the object-side surface 2 of the first lens L11 in the direction toward the image plane IMG, and the first stop ST11 may be located inside the lens system. In this case, the optical lens assembly 100-1 may have a large size, or the first stop ST11 may not be precisely operated. Conversely, if the first stop ST11 is distant from the object-side surface 2 of the first lens L11 in the direction toward the object by more than the sag value, the optical lens assembly 100-1 may have a large size, and thus it may be difficult to decrease the size of the optical lens assembly 100-1.

Condition 2 restricts the curvature of the object-side surface 2 of the first lens L11. If R1/f exceeds the upper limit of Condition 2, the object-side surface 2 of the first lens L11 may be too flat. In this case, it may be difficult to ensure the sag value for placing the first stop ST11, and the first stop ST11 may have poor efficiency. If R1/f is less than the lower limit of Condition 2, the curvature of the object-side surface 2 of the first lens L11 may be too large, and the refractive power of the first lens L11 may be excessively high, thereby causing spherical aberration.

The optical lens assemblies of the various embodiments may satisfy the following conditions.

$$0.4 < \frac{Fno1}{Fno2} < 0.8 \quad \langle\text{Condition 3}\rangle$$

where Fno1 denotes an F number when the second stop ST21 is in a maximally opened state, and Fno2 denotes an F number when the first stop ST11 is in a variably opened state.

Condition 3 specifies the ratio of the F number of the second stop ST21 in a maximally opened state to the F number of the first stop ST11 being a small stop. If $$\frac{Fno1}{Fno2}$$

exceeds the upper limit of Condition 2, the F number of the maximally opened stop may increase to cause a decrease in the brightness of images under a low-illumination condition, or the F number of the small stop may decrease to cause a decrease in the quality of images when the small stop is opened under a high-illumination condition. If $$\frac{Fno1}{Fno2}$$

is less than the lower limit of Condition 3, the F number of the maximally opened stop may decrease to cause a decrease in the field of focus, or the F number of the small stop may increase to cause a decrease in performance because of the diffraction limit.

The optical lens assemblies of the various embodiments may satisfy the following conditions.

$$0.4 < \frac{TT}{Y_{IH}} < 1.8 \quad \langle\text{Condition 4}\rangle$$

where TT denotes a distance from the first stop ST11 to the image sensor along the optical axis OA, and $Y_{IH}$ denotes half the diagonal length of the image sensor.

If $$\frac{TT}{Y_{IH}}$$

exceeds the upper limit of Condition 4, it is difficult to reduce the size of the optical lens assembly 100-1. If $$\frac{TT}{Y_{IH}}$$

is less than the lower limit of Condition 4, the first stop ST11 is excessively close to the image sensor, and thus it is difficult to correct distortion at a wide field of view and reduce the angle of incidence of rays on the image sensor.

The optical lens assemblies of the various embodiments may satisfy the following conditions.

$$0 < \frac{t21}{Y_{IH}} < 1.0 \quad \langle\text{Condition 5}\rangle$$

where t21 denotes a distance from the first stop ST11 to the second stop ST21 along the optical axis OA, and $Y_{IH}$ denotes half the diagonal length of the image sensor.

Condition 5 specifies the ratio of the distance between the first stop ST11 and the second stop ST21 to the height of the image plane IMG. If $$\frac{t21}{Y_{IH}}$$

exceeds the upper limit of Condition 5, the second stop ST21 is excessively close to the image plane IMG. In this case, peripheral rays may be excessively blocked, and thus the amount of peripheral light may be small. It $$\frac{t21}{Y_{IH}}$$

is less than the lower limit of Condition 5, the second stop ST21 is placed at the object side of the first stop ST11, and thus, it may be difficult for the second stop ST21 to correct coma aberration at the maximum aperture.

The optical lens assemblies of the various embodiments may satisfy the following conditions.

$$0.1 < \frac{s2}{Y_{IH}} < 0.5 \qquad \langle\text{Condition 6}\rangle$$

where s2 denotes the radius of the first stop ST11 at its maximum F number, and $Y_{IH}$ denotes half the diagonal length of the image sensor.

Condition 6 specifies the ratio of the radius of the first stop ST11 at the maximum F number of the first stop ST11 to the height of the image plane IMG. If $$\frac{s2}{Y_{IH}}$$

exceeds the upper limit of Condition 6, the radius of the first stop ST11 may be excessively large, and thus the F number of the first stop ST11 may be excessively low. In this case, when the first stop ST11 is opened, the quality of images may decrease. If $$\frac{s2}{Y_{IH}}$$

is less than the lower limit of Condition 6, the radius of the first stop ST11 may be excessively small, and thus the F number of the first stop ST11 may be excessively large. In this case, optical performance may be lowered due to the diffraction limit.

The optical lens assemblies of the various embodiments may satisfy the following conditions.

$$0.4 < \frac{f}{f2} < 1.6 \qquad \langle\text{Condition 7}\rangle$$

where f denotes the total focal length of the optical lens assembly 100-1, and f2 denotes the focal length of the second lens L21.

If $$\frac{f}{f2}$$

exceeds the upper limit of Condition 7, the refractive power of the second lens L21 may be excessively high, making it difficult to correct aberration. If $$\frac{f}{f2}$$

is less than the lower limit of Condition 7, the refractive power of the second lens L21 may be excessively low, making it difficult to reduce the size of the camera module.

When the optical lens assembly of any one of the various embodiments is focused to compensate for variations in the image plane caused by variations in the distance from an object, the entire lens system may be moved, and the first and second stops may be moved together with the lens system. If a lens system and a stop are moved together as described above, variations in the amount of peripheral light and coma aberration may be reduced, and thus deterioration of optical performance may be reduced.

In the descriptions of the optical lens assemblies of the various embodiments, the term "aspheric" or "aspheric surface" has the following definition.

When an optical axis is set as a z-axis, a direction perpendicular to the optical axis is set as a y-axis, and the propagation direction of rays is denoted as a positive direction, an aspheric surface of a lens may be defined by the following condition 8. In Condition 8, z denotes a distance measured from the vertex of the lens in the direction of the optical axis of the lens, y denotes a distance measured from the optical axis in a direction perpendicular to the optical axis, K denotes a conic constant, A, B, C, D, . . . denote aspheric coefficients, and c denotes the reciprocal (1/R) of the radius of curvature at the vertex of the lens.

$$z = \frac{cy^2}{1 + \sqrt{1 - (K+1)c^2 y^2}} + Ay^4 + By^6 + Cy^8 + Dy^{10} + \ldots \qquad \langle\text{Condition 8}\rangle$$

In the present disclosure, various optical lens assemblies may be implemented according to numerical embodiments as described below.

In the following numerical embodiments, lens surfaces are sequentially numbered with 1, 2, 3, . . . , n in the direction from the object to the image plane IMG where n is a positive integer. In addition, f refers to the focal length of an optical lens assembly, Fno refers to F-number, 2ω refers to field of view, R refers to radius of curvature, do refers to lens thickness or air gap between lenses, Nd refers to refractive index, and Vd refers to Abbe number. obj refers to the object, and H-Ape refers to effective diameter. * refers to aspheric surface.

First Numerical Embodiment

FIG. 1 illustrates the optical lens assembly 100-1 of the first numerical embodiment according to various embodiments, and, for example, Table 1 shows design data of the first numerical embodiment.

f: 4.20 mm, 2 w: 78.02°, d2: 0.1 mm, sag1: 0.28 mm, Fno1: 1.56, Fno2: 2.88 TT: 5.4 mm, $Y_{IH}$: 3.5 mm, t21: 0.318 mm

TABLE 1

| Lens Surfaces | R | dn | nd | vd | H-Ape | f |
|---|---|---|---|---|---|---|
| obj | infinity | infinity | | | | |
| ST11 | infinity | −0.1 | | | D1 | |
| 2* | 2.423 | 0.418 | 1.5441 | 56.09 | 1.38 | 10.7123 |
| ST21(3)* | 3.882 | 0.231 | | | 1.32 | |
| 4* | 3.016 | 0.722 | 1.5441 | 56.09 | 1.31 | 3.8366 |
| 5* | −6.297 | 0.02 | | | 1.28 | |
| 6* | 9.787 | 0.24 | 1.65038 | 21.52 | 1.20 | −5.4437 |
| 7* | 2.595 | 0.486 | | | 1.18 | |
| 8* | infinity | 0.364 | 1.65038 | 21.52 | 1.30 | infinity |
| 9* | infinity | 0.326 | | | 1.47 | |
| 10* | 5.231 | 0.941 | 1.5441 | 56.09 | 1.71 | 4.7373 |
| 11* | −4.8 | 0.132 | | | 2.30 | |
| 12* | 3.779 | 0.507 | 1.5348 | 55.71 | 2.69 | −3.3637 |
| 13* | 1.165 | 0.263 | | | 3.04 | |
| 14 | infinity | 0.11 | 1.5168 | 64.20 | 3.17 | |
| 15 | infinity | 0.64 | | | 3.20 | |
| IMG | | | | | | |

Table 2 shows aspheric coefficients in the first numerical embodiment.

TABLE 2

| Lens Surfaces | K(Conic) | A(4th) | B(6th) | C(8th) | D(10th) |
|---|---|---|---|---|---|
| 2 | −2.23959 | −0.01513 | −0.00429 | 0.00307 | −0.02309 |
| 3 | −2.39313 | −0.06386 | 0.021238 | −0.0613 | 0.149848 |
| 4 | 1.651358 | −0.05725 | 0.072616 | −0.29423 | 0.708346 |
| 5 | 19.59925 | 0.000861 | −0.08507 | 0.258418 | −0.54178 |
| 6 | −19.7524 | −0.04651 | 0.046943 | −0.11376 | 0.14405 |
| 7 | −8.15679 | 0.020114 | −0.00229 | 0.062001 | −0.2526 |
| 8 | −1 | −0.03387 | −0.0338 | −0.06241 | 0.559919 |
| 9 | −1 | −0.01662 | −0.22083 | 0.43582 | −0.51131 |
| 10 | 7.812542 | 0.091594 | −0.23064 | 0.196172 | −0.08054 |
| 11 | 2.828866 | 0.258111 | −0.2315 | 0.139869 | −0.06535 |
| 12 | −1.3115 | −0.14453 | 0.044658 | −0.00876 | 0.001607 |
| 13 | −5.0663 | −0.11044 | 0.059606 | −0.02659 | 0.007994 |

| Lens Surfaces | E(12th) | F(14th) | G(16th) | H(18th) | J(20th) |
|---|---|---|---|---|---|
| 2 | 0.046025 | −0.04951 | 0.030577 | −0.00981 | 0.001249 |
| 3 | −0.18243 | 0.121795 | −0.0408 | 0.004922 | 0.000171 |
| 4 | −0.98125 | 0.824201 | −0.41378 | 0.114055 | −0.01333 |
| 5 | 0.77387 | −0.70831 | 0.395735 | −0.12262 | 0.016131 |
| 6 | −0.05533 | −0.0614 | 0.086325 | −0.04092 | 0.007127 |
| 7 | 0.491632 | −0.55745 | 0.380021 | −0.14384 | 0.023186 |
| 8 | −1.16989 | 1.251872 | −0.75688 | 0.246963 | −0.03407 |
| 9 | 0.421504 | −0.24644 | 0.097261 | −0.0227 | 0.002299 |
| 10 | −0.03168 | 0.058068 | −0.03069 | 0.007526 | −0.00072 |
| 11 | 0.022228 | −0.00518 | 0.000768 | −6.46E−05 | 2.33E−06 |
| 12 | −0.00028 | 3.58E−05 | −2.94E−06 | 1.35E−07 | −2.61E−09 |
| 13 | −0.00149 | 0.000172 | −1.18E−05 | 4.49E−07 | −7.22E−09 |

Table 3 shows F numbers in the first numerical embodiment.

TABLE 3

| | Fno when second stop is maximally opened | Fno of first stop |
|---|---|---|
| D1 | 1.5 | 0.73 |

Figure 2:
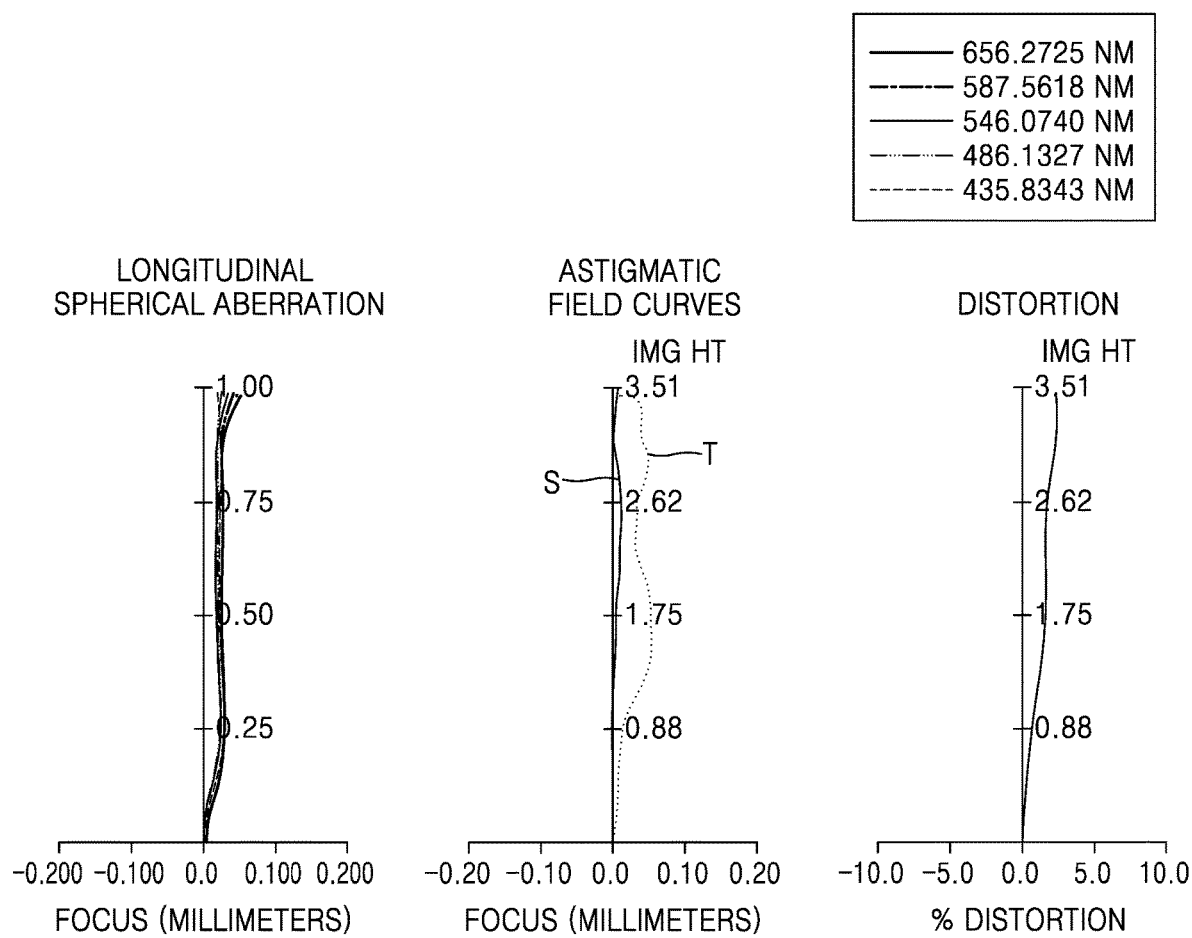
FIG. 2 illustrates aberration diagrams of the optical lens assembly of the first numerical embodiment according to various embodiments.

FIG. 2 illustrates longitudinal spherical aberration, astigmatic field curves, and distortion of the optical lens assembly 100-1 of the first numerical embodiment. For example, the longitudinal spherical aberration was measured with light having wavelengths of 656.2725 nanometers (NM), 587.5618 NM, 546.07400 NM, 486.1327 NM, and 435.8343 NM, and the astigmatic field curves include a tangential field curvature T and a sagittal field curvature S. The astigmatic field curves were measured with light having wavelengths of 587.5618 NM, and the distortion was measured with light having a wavelength of 587.5618 NM.

Second Numerical Embodiment

FIG. 3 illustrates the optical lens assembly 100-2 of the second numerical embodiment according to various embodiments, and, for example, Table 2 shows design data of the second numerical embodiment.

f: 4.34 mm, 2 w: 75.85°, d2: 0.15 mm, sag1: 0.52 mm, Fno1: 1.57, Fno2: 2.71

TT: 5.27 mm, $Y_{IH}$: 3.5 mm, t21: 1.076 mm

TABLE 4

| Lens Surfaces | R | dn | nd | vd | H-Ape | f |
|---|---|---|---|---|---|---|
| obj | infinity | infinity | | | | |
| ST12 | infinity | −0.15 | | | D1 | |
| 2* | 2.103 | 0.533 | 1.5441 | 56.09 | 1.53 | 9.5054 |
| 3* | 3.217 | 0.05 | | | 1.37 | |
| 4* | 2.782 | 0.613 | 1.5441 | 56.09 | 1.31 | 4.7142 |
| 5* | −32.133 | 0.03 | | | 1.25 | |
| ST22(6)* | 6.266 | 0.24 | 1.65038 | 21.52 | 1.18 | −5.3975 |
| 7* | 2.231 | 0.252 | | | 1.06 | |
| 8* | 4.519 | 0.335 | 1.5441 | 56.09 | 1.06 | 13.0323 |
| 9* | 12.04 | 0.355 | | | 1.17 | |
| 10* | infinity | 0.31 | 1.65038 | 21.52 | 1.38 | infinity |
| 11* | infinity | 0.325 | | | 1.58 | |
| 12* | 7.202 | 0.635 | 1.61442 | 25.95 | 1.66 | 14.3596 |
| 13* | 36.418 | 0.203 | | | 2.20 | |

TABLE 4-continued

| Lens Surfaces | R | dn | nd | vd | H-Ape | f |
|---|---|---|---|---|---|---|
| 14* | 2.617 | 0.475 | 1.5348 | 55.71 | 2.52 | −5.6679 |
| 15* | 1.318 | 0.164 | | | 2.86 | |
| 16 | infinity | 0.11 | 1.5168 | 64.20 | 3.14 | infinity |
| 17 | infinity | 0.64 | | | 3.18 | |
| img | | | | | | |

Table 5 shows aspheric coefficients in the second numerical embodiment.

TABLE 5

| Lens Surfaces | K(Conic) | A(4th) | B(6th) | C(8th) | D(10th) |
|---|---|---|---|---|---|
| 2 | −0.73267 | −0.00909 | 0.021364 | −0.06406 | 0.103376 |
| 3 | 0.179035 | 0.00398 | −0.10025 | 0.265273 | −0.5396 |
| 4 | −1.30187 | 0.033019 | −0.06214 | 0.153863 | −0.33458 |
| 5 | −67.2586 | 0.026722 | 0.183577 | −0.61705 | 0.836905 |
| 6 | 22.52146 | −0.12277 | 0.502914 | −1.42405 | 2.374521 |
| 7 | −9.60916 | −0.02902 | 0.217672 | −0.50194 | 0.625737 |
| 8 | −89.1585 | 0.115271 | −0.56762 | 2.506988 | −7.69436 |
| 9 | 73.74072 | −0.02799 | 0.023716 | −0.2201 | 0.747559 |
| 10 | −1 | −0.00855 | −0.27937 | 0.699821 | −1.01349 |
| 11 | −1 | −0.00736 | −0.27799 | 0.49354 | −0.49802 |
| 12 | 13.46983 | 0.064712 | −0.21007 | 0.14912 | −0.04812 |
| 13 | 46.93376 | 0.072975 | −0.09117 | 0.032167 | −0.00526 |
| 14 | −26.5656 | −0.20449 | 0.102554 | −0.04637 | 0.018601 |
| 15 | −6.55541 | −0.14847 | 0.090872 | −0.05014 | 0.02055 |

| Lens Surfaces | E(12th) | F(14th) | G(16th) | H(18th) | J(20th) |
|---|---|---|---|---|---|
| 2 | −0.1089 | 0.071644 | −0.0281 | 0.006051 | −0.00055 |
| 3 | 0.646915 | −0.44655 | 0.176888 | −0.03713 | 0.003151 |
| 4 | 0.390796 | −0.237 | 0.070145 | −0.00674 | −0.00055 |
| 5 | −0.59101 | 0.182645 | 0.017116 | −0.02635 | 0.004924 |
| 6 | −2.45717 | 1.601386 | −0.64269 | 0.14713 | −0.01526 |
| 7 | −0.1417 | −0.59928 | 0.779712 | −0.40193 | 0.079887 |
| 8 | 14.92814 | −18.097 | 13.28673 | −5.40018 | 0.933669 |
| 9 | −1.47642 | 1.709373 | −1.15214 | 0.418776 | −0.06245 |
| 10 | 0.889278 | −0.4716 | 0.143811 | −0.02233 | 0.001318 |
| 11 | 0.309307 | −0.11217 | 0.021628 | −0.00176 | 1.69E−05 |
| 12 | −0.02723 | 0.040265 | −0.01983 | 0.004563 | −0.00041 |
| 13 | 0.00048 | −0.00011 | 2.76E−05 | −3.05E−06 | 1.16E−07 |
| 14 | −0.00508 | 0.000869 | −9.00E−05 | 5.18E−06 | −1.28E−07 |
| 15 | −0.00561 | 0.000969 | −0.0001 | 5.76E−06 | −1.38E−07 |

Table 6 shows F numbers in the second numerical embodiment.

TABLE 6

| | Fno of second stop at maximum aperture | Fno of first stop |
|---|---|---|
| D1 | 1.8 | 0.8 |

Figure 4:
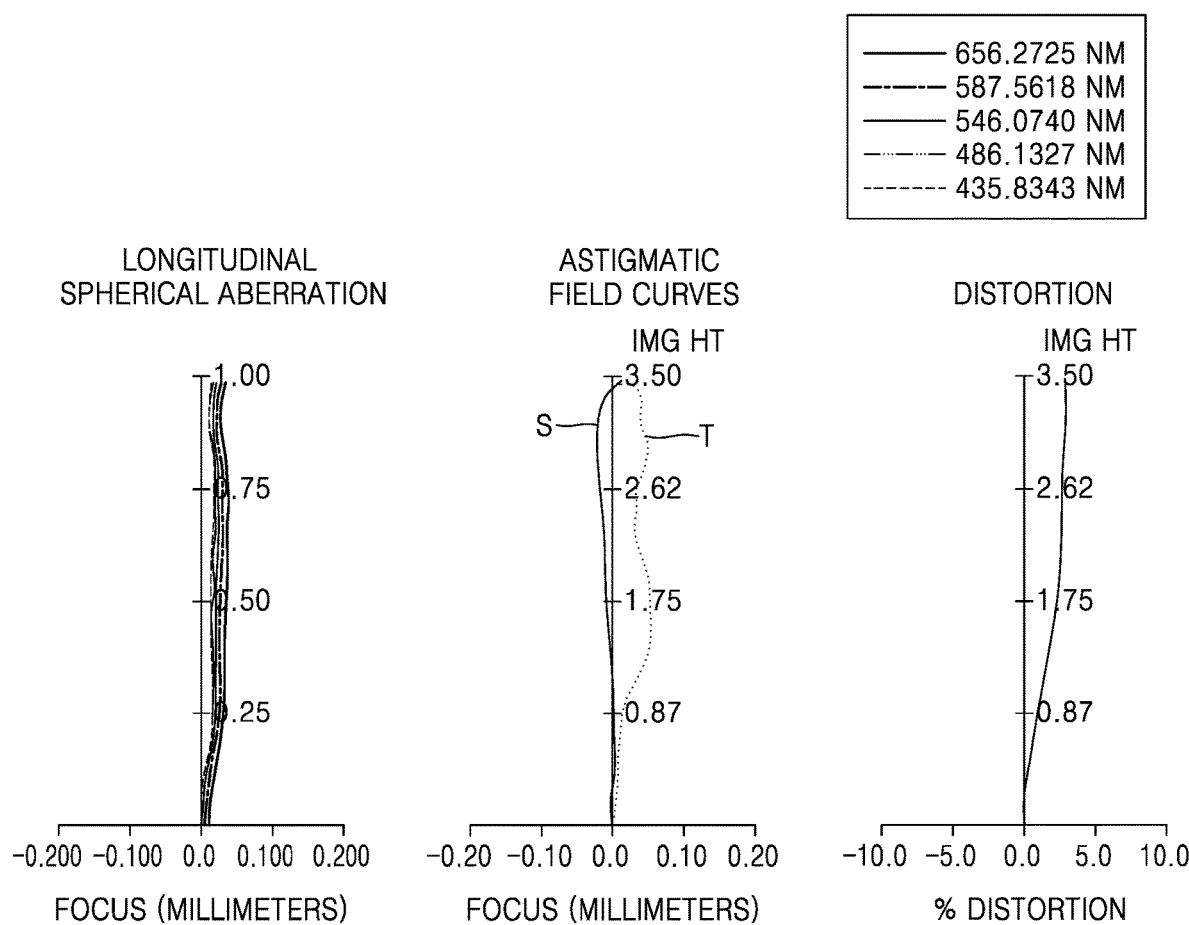
FIG. 4 illustrates aberration diagrams of the optical lens assembly of the second numerical embodiment according to various embodiments.

FIG. 4 illustrates longitudinal spherical aberration, astigmatic field curves, and distortion of the optical lens assembly 100-2 of the second numerical embodiment.

Table 7 shows that the optical lens assemblies of the various embodiments satisfy Conditions 1 to 7.

TABLE 7

| | Embodiment 1 | Embodiment 2 |
|---|---|---|
| Condition 1 | 0.357 | 0.288 |
| Condition 2 | 0.577 | 0.485 |
| Condition 3 | 0.542 | 0.579 |
| Condition 4 | 1.514 | 1.463 |
| Condition 5 | 0.091 | 0.307 |

TABLE 7-continued

| | Embodiment 1 | Embodiment 2 |
|---|---|---|
| Condition 6 | 0.209 | 0.229 |
| Condition 7 | 1.095 | 0.921 |

Figure 5:
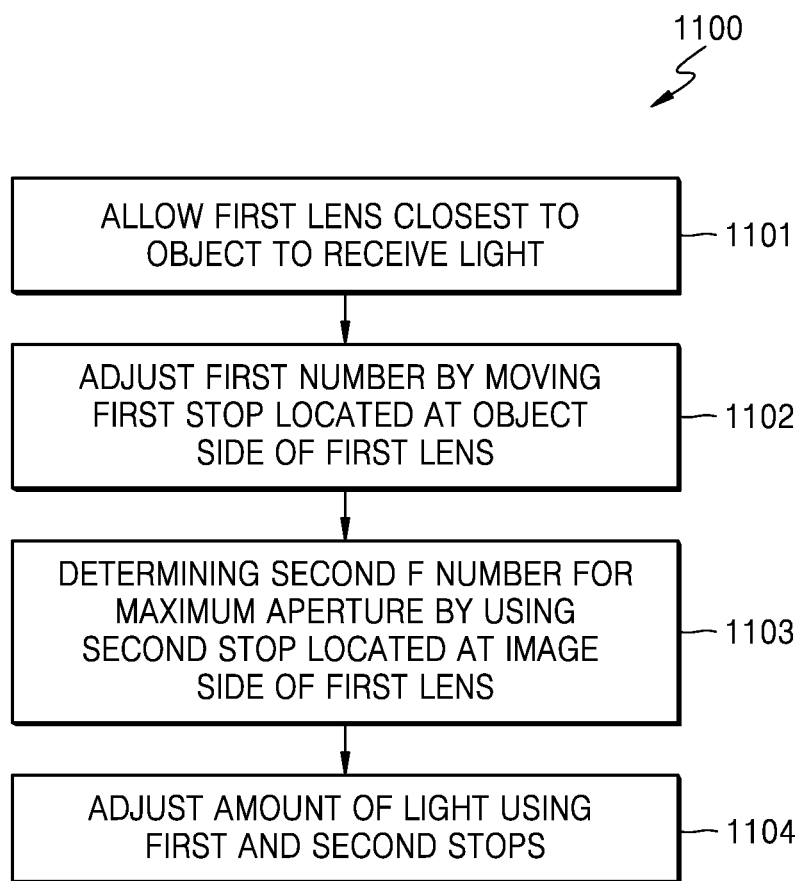
FIG. 5 illustrates a method of forming an image using an optical lens assembly according to various embodiments.

FIG. 5 is a high-level flowchart 1100 for explaining a method of forming an image using any one of the optical lens assemblies of the various embodiments described with reference to FIGS. 1 to 4.

According to an embodiment, in operation 1101, for example, the first lens of the optical lens assembly closest to an object may receive light. In operation 1102, for example, the first stop located at the object side of the first lens may be moved to adjust the first F number. The first stop may be a variable stop functioning as the smaller stop. In operation 1103, for example, the second stop located at the image side of the first lens may determine a second F number for maximum aperture. The second stop may be a fixed stop determining the maximum aperture of the optical lens assembly. The second stop may be between the first lens and an image plane.

In operation 1104, for example, the amount of light in the optical lens assembly may be adjusted using the first and second stops according to various embodiments. According to various embodiments, when forming an image, the amount of light may be maximized under low-illumination conditions by using the second stop determining the F number for the maximum aperture so as to obtain bright images, and the first stop determining the F number of the smaller stop may be used so as to obtain high-resolution images under high-illumination conditions.

For example, the optical lens assemblies of the various embodiments may be used in electronic apparatuses employing imaging devices. The optical lens assemblies of the various embodiments may be applied to various electronic apparatuses such as digital cameras, interchangeable lens cameras, video cameras, smartphone cameras, or cameras of small mobile devices.

Figure 6:
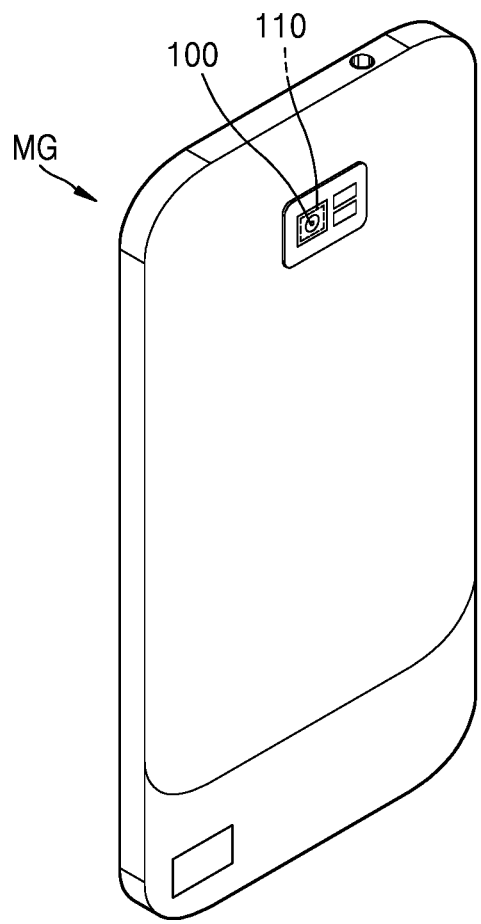
FIG. 6 illustrates an electronic apparatus including an optical lens assembly according to various embodiments.

FIG. 6 illustrates an electronic apparatus MG including an optical lens assembly 100 according to an embodiment. FIG. 6 illustrates a non-limiting example where the electronic apparatus MG is a mobile phone. The electronic apparatus MG may include: at least one optical lens assembly 100; and an image sensor 110 configured to receive images formed by the at least one optical lens assembly 100 and convert the images into electric image signals. The optical lens assembly 100 may be any one of the optical lens assemblies described with reference to FIGS. 1 to 4. If the optical lens assemblies of the various embodiments are used in photographing apparatuses such as small digital cameras or cameras of mobile phones, the photographing apparatuses may have high photographing performance.

The image sensor 110 may include infrared-sensitive pixels. The infrared-sensitive pixels may enable infrared photographing when it is difficult to perform visible light photographing, for example, when indoors or at night. Color filters included in the image sensor 110 may transmit wavelengths of light corresponding to red, green, and blue, and infrared wavelengths as well. Therefore, if infrared wavelengths are not blocked, the infrared wavelengths may generate noise in the image generated from visible light. Accordingly, infrared rays may be blocked using an additional filter or coating. In some embodiments, an infrared-cut film may be between a first lens group and a second lens group at a position where the diameter of a light beam is small, and the infrared-cut film may be moved using an actuator. Thus, the actuator may move the infrared-cut film may be outside the optical path when reception of infrared light is desired. When visible light photographing is performed using the image sensor 110 having infrared-sensitive pixels, infrared rays may be blocked using the infrared-cut film. Alternatively, infrared noise may be removed using signal processing by a processor instead of using the infrared-cut film. In addition, when infrared photographing is performed, the infrared-cut film may be moved outside the optical path, and infrared images may be obtained using the infrared-sensitive pixels.

Figure 7:
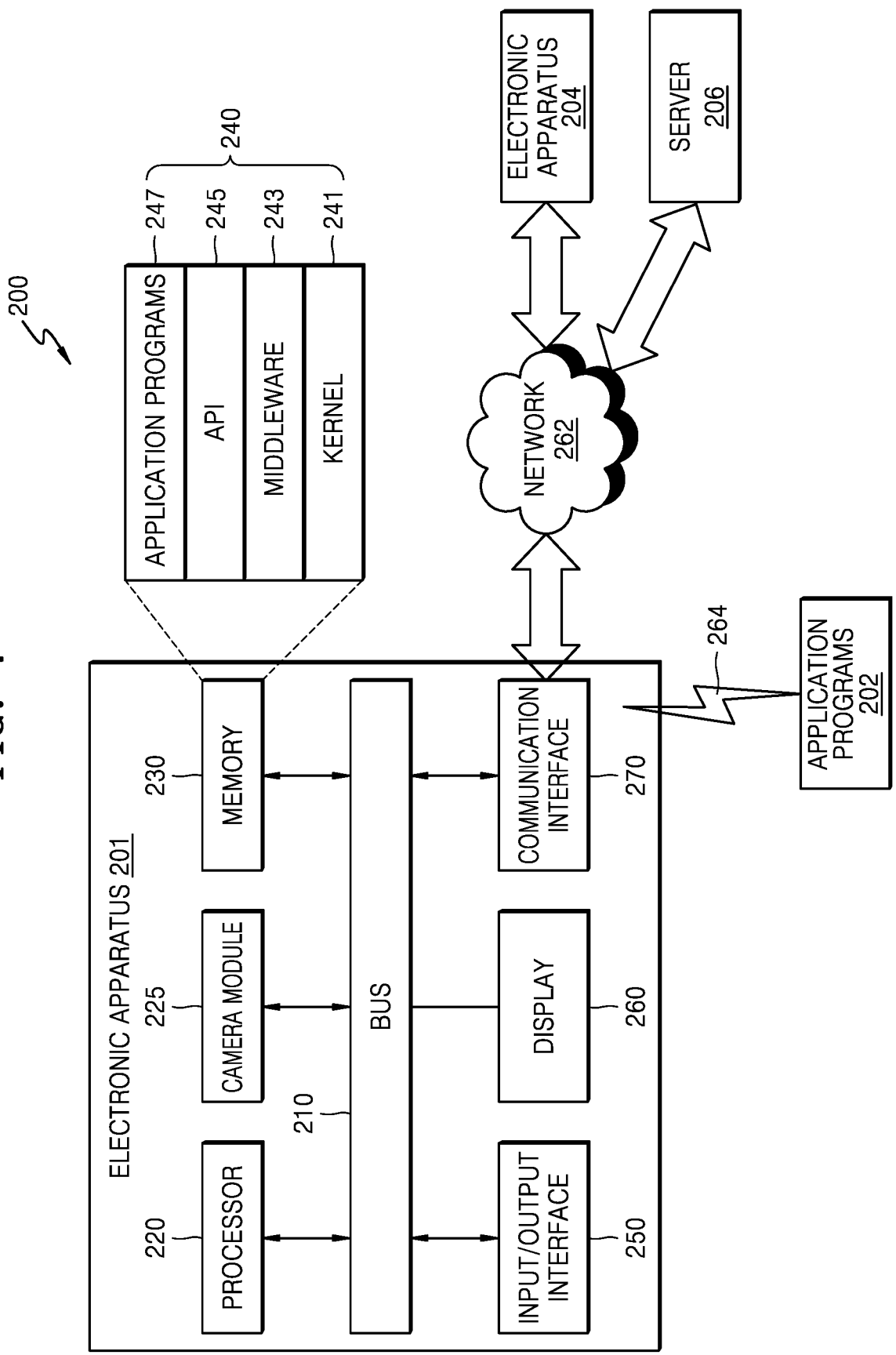
FIG. 7 illustrates a network environment system according to various embodiments.

FIG. 7 illustrates an electronic apparatus 201 in a network environment 200 according to various embodiments. The electronic apparatus 201 may include a bus 210, a processor 220, a camera module 225, a memory 230, an input/output interface 250, a display 260, and a communication interface 270. In some embodiments, at least one of the elements of the electronic apparatus 201 may be omitted, or the electronic apparatus 201 may include another element.

For example, the bus 210 may include a circuit configured to connect the elements 210 to 270 for communication therebetween (for example, transmission of control messages and/or data).

The processor 220 may include one or more of a central processing unit (CPU), an application processor (AP), and a communication processor (CP). For example, the processor 220 may perform calculations or data processing which relates to control and/or communication of at least one of the other elements of the electronic apparatus 201.

For example, the camera module 225 may take still images and videos. According to an embodiment, the camera module 225 may include at least one image sensor (for example, a front image sensor or a rear image sensor), a lens, an image signal processor (ISP), or a flash (for example, a light-emitting diode (LED) or a xenon lamp). For example, the camera module 225 may include any one of the optical lens assemblies of the various embodiments.

The memory 230 may include a volatile memory and/or a nonvolatile memory. For example, the memory 230 may store instructions or data relating to at least one of the other elements of the electronic apparatus 201. According to an embodiment, the memory 230 may include software and/or a program 240. For example, the program 240 may include a kernel 241, middleware 243, an application programming interface (API) 245, and/or application programs (or applications) 247. At least a part of the kernel 241, the middleware 243, or the API 245 may function as an operating system (OS).

For example, the kernel 241 may control or manage system resources (such as the bus 210, the processor 220, or the memory 230) used to execute operations or functions of the other programs (such as the middleware 243, the API 245, or the application programs 247). In addition, the kernel 241 may provide an interface allowing the middleware 243, the API 245, or the application programs 247 to access individual elements of the electronic apparatus 201, thereby making it possible to control or manage system resources.

For example, the middleware 243 may function as an intermediary so that the API 245 or the application programs 247 may communicate with the kernel 241 for transmission of data therebetween.

In addition, the middleware 243 may process one or more operation requests from the application programs 247 in the order of priority. For example, the middleware 243 may give priority to at least one of the application programs 247 such that the at least one of the application programs 247 may use system resources (such as the bus 210, the processor 220, or the memory 230) of the electronic apparatus 201. For example, the middleware 243 may process the one or more operation requests from the application programs 247 according to the priority given to at least one of the application programs 247. In this manner, the middleware 243 may perform a scheduling or load-balancing operation relating to the one or more operation requests.

For example, the API 245 may be an interface through which the application programs 247 control functions provided by the kernel 241 or the middleware 243. For example, the API 245 may include at least one interface or function (for example, a command) for file control, window control, image processing, or text control.

For example, the input/output interface 250 may function as an interface for transmitting instructions or data input from a user or another external device to one or more of the other elements of the electronic apparatus 201. In addition, the input/output interface 250 may transmit instructions or data received from one or more of the other elements of the electronic apparatus 201 to a user or another external device.

For example, the display 260 may include a liquid crystal display (LCD), an LED display, an organic light-emitting diode (OLED) display, a microelectromechanical system (MEMS) display, or an electronic paper display. For example, the display 260 may display content (such as texts, images, videos, icons, or symbols) for users. The display 260 may include a touch screen. For example, the display 260 may receive an input through a touch, a gesture, an approaching action, or a hovering action by an electronic pen or a user's body part.

For example, the communication interface 270 may enable communication between the electronic apparatus 201 and an external device (for example, a first external electronic apparatus 202, a second external electronic apparatus 204, or a server 206). For example, the communication interface 270 may communicate with external devices (for example, the second external electronic apparatus 204 or the server 206) connected to a network 262 by a wireless communication method or a wired communication method.

For example, the wireless communication method may use a cellular protocol. For example, the wireless communication method may use at least one of long-term evolution (LTE), LTE advance (LTE-A), code division multiple access (CDMA), wideband CDMA (WCDMA), universal mobile telecommunications system (UMTS), wireless broadband (WiBro), or global system for mobile communications (GSM). In addition, the wireless communication method may include short-range communication 264. For example, the short-range communication 264 may include at least one of wireless fidelity (WiFi), Bluetooth, near field communication (NFC), or global navigation satellite system (GNSS). For example, according to regions or bandwidths, GNSS may include at least one of global positioning system (GPS), global navigation satellite system (Glonass), Beidou navigation satellite system (hereinafter referred to as Beidou), or the European global satellite-based navigation system (Galileo). In the present disclosure, "GPS" and "GNSS" may be interchangeably used. For example, the wired communication method may use at least one of universal serial bus (USB), high definition multimedia interface (HDMI), recommended standard-232 (RS-232), or plain old telephone service (POTS). For example, the network 262 may include at least one of a telecommunications network, a computer network (such as a local area network (LAN) or a wide area network (WAN)), the Internet, or a telephone network.

Each of the first external electronic apparatus 202 and the second external electronic apparatus 204 may be the same as or different from the electronic apparatus 201. According to an embodiment, the server 206 may include a group of one or more servers. According to an embodiment, all or some operations of the electronic apparatus 201 may be performed in one or more other electronic apparatuses (such as the first and second external electronic apparatuses 202 and 204) or the server 206. According to an embodiment, when the electronic apparatus 201 has to perform a function or service by request or automation, instead of or in addition to performing the function or service by itself, the electronic apparatus 201 may request the server 206 or other devices (such as the first external electronic apparatus 202 or the second external electronic apparatus 204) to perform at least a part of the function or service. The server 206 or other devices (such as the first external electronic apparatus 202 or the second external electronic apparatus 204) may perform the at least part of the function or service in response to the request and may send results thereof to the electronic apparatus 201. The electronic apparatus 201 may intactly use the received results or may process the received results so as to implement the function or service. To this end, for example, cloud computing, distributed computing, or client-server computing technology may be used.

Figure 8:
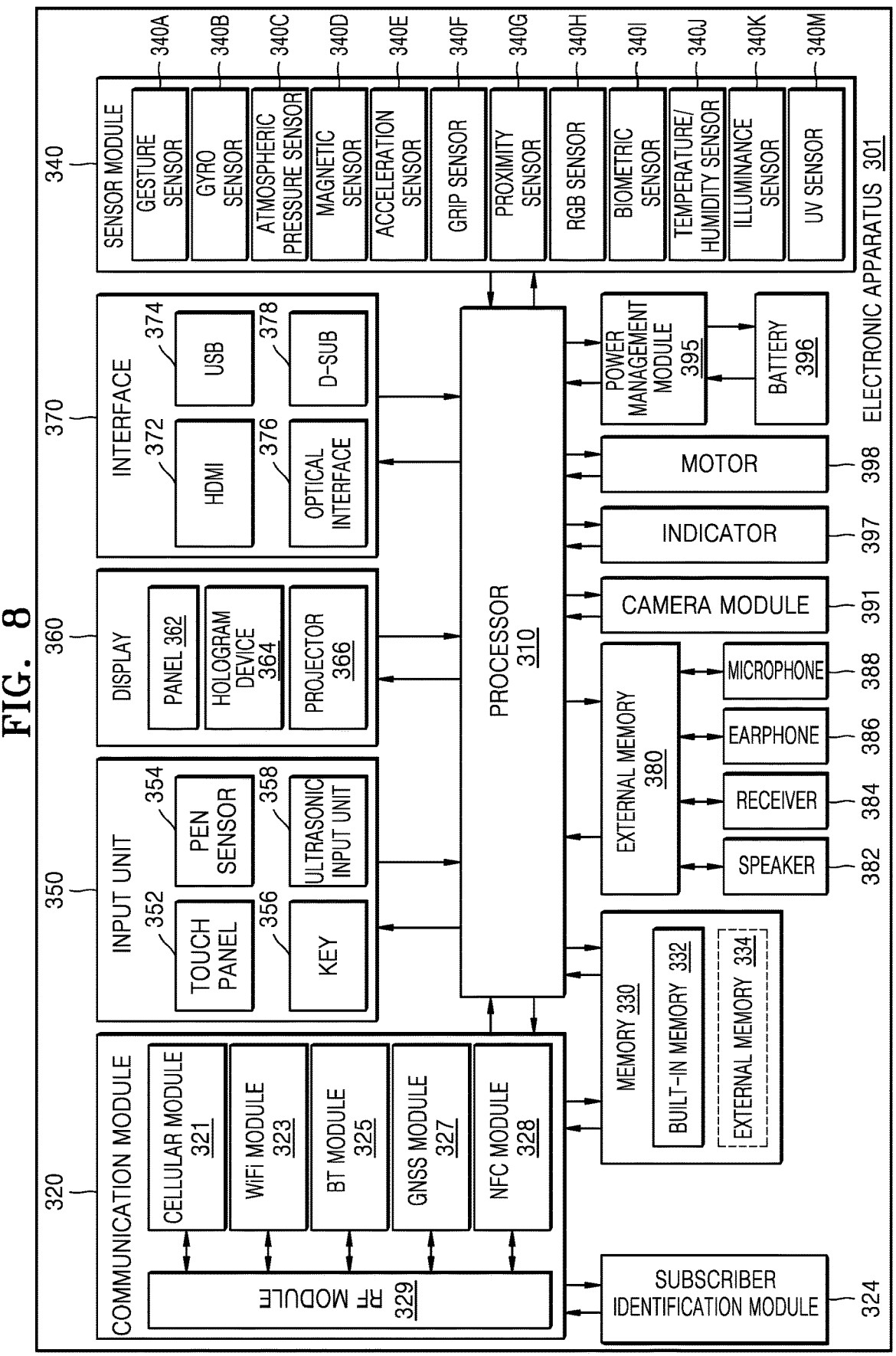
FIG. 8 illustrates a block diagram illustrating an electronic apparatus according to various embodiments.

FIG. 8 is a block diagram illustrating an electronic apparatus 301 according to various embodiments. The electronic apparatus 301 may entirely or partially include the electronic apparatus 201 illustrated in FIG. 7. The electronic apparatus 301 may include at least one processor 310 (such as an AP), a communication module 320, a subscriber identification module 324, a memory 330, a sensor module 340, an input unit 350, a display 360, an interface 370, an audio module 380, a camera module 391, a power management module 395, a battery 396, an indicator 397, and a motor 398.

For example, the processor 310 may control many pieces of hardware or software connected to the processor 310 by executing an OS or an application program, and may perform data processing and calculations. For example, the processor 310 may be implemented as a system on chip (SoC). According to an embodiment, the processor 310 may include a graphics processing unit (GPU) and/or image signal processor. The processor 310 may include at least one element illustrated in FIG. 8 (for example, a cellular module 321). The processor 310 may load instructions or data transmitted from at least one of the other elements (such as a nonvolatile memory) on a volatile memory and may process the instructions or data, and may store various data on the nonvolatile memory.

The structure of the communication module 320 may be the same as or similar to the structure of the communication interface 270 illustrated in FIG. 7. For example, the communication module 320 may include the cellular module 321, a WiFi module 323, a Bluetooth module 325, a GNSS module 327 (such as a GPS module, a Glonass module, a Beidou module, or a Galileo module), an NFC module 328, and a radio frequency (RF) module 329.

For example, the cellular module 321 may provide services such as voice calling, video calling, text messaging, or Internet connection by using a communication network. According to an embodiment, the cellular module 321 may identify and authenticate the electronic apparatus 301 in a communication network by using the subscriber identification module 324 (for example, a subscriber identification module (SIM) card). According to an embodiment, the cellular module 321 may perform at least one of functions that the processor 310 may provide. According to an embodiment, the cellular module 321 may include a communication processor (CP).

For example, each of the WiFi module 323, the Bluetooth module 325, the GNSS module 327, and the NFC module 328 may include a processor to process received data or data to be transmitted. In some embodiments, at least one of (for example, two of) the cellular module 321, the WiFi module 323, the Bluetooth module 325, the GNSS module 327, or the NFC module 328 may be included in an integrated chip (IC) or an IC package.

For example, the RF module 329 may transmit and receive communication signals (for example, RF signals). For example, the RF module 329 may include a transceiver, a power amp module (PAM), a frequency filter, a low noise amplifier (LNA), or an antenna. In other embodiments, at least one of the cellular module 321, the WiFi module 323, the Bluetooth module 325, the GNSS module 327, or the NFC module 328 may transmit and receive RF signals using a separate RF module.

For example, the subscriber identifier module 324 may include a SIM card or an embedded SIM. The subscriber identification module 324 may include unique identification information (such as an integrated circuit card identifier (ICCID)) or subscriber information (such as an international mobile subscriber identity (IMSI)).

For example, the memory 330 may include a built-in memory 332 or an external memory 334. For example, the built-in memory 332 may include at least one of a volatile memory such as dynamic random access memory (DRAM), static random access memory (SRAM), or synchronous dynamic random access memory (SDRAM); or a nonvolatile memory such as one time programmable read only memory (OTPROM), programmable read only memory (PROM), erasable and programmable read only memory (EPROM), electrically erasable and programmable read only memory (EEPROM), mask read only memory (ROM), flash ROM, a flash memory (for example, a NAND flash memory or a NOR flash memory), a hard disk drive, or a solid state drive (SSD).

The external memory 334 may include a flash drive and may further include, for example, a compact flash (CD) card, a secure digital (SD) card, a micro secure digital (Micro-SD) card, a mini secure digital (Mini-SD) card, an extreme digital (xD) card, a multi-media card (MMC), or a memory stick. The external memory 334 may be operatively and/or physically connected to the electronic apparatus 301 through various interfaces.

For example, the sensor module 340 may measure physical quantities or detect operational states of the electronic apparatus 301, and may convert measured or detected information into electric signals. For example, the sensor module 340 may include at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (such as a red-green-blue (RGB) sensor), a biometric sensor 340I, a temperature/humidity sensor 340J, an illuminance sensor 340K, or an ultraviolet (UV) sensor 340M. Additionally or alternatively, the sensor module 340 may, for example, include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit configured to control at least one sensor of the sensor module 340. In some embodiments, the electronic apparatus 301 may further include a processor as a part of or independently of the processor 310 so as to control the sensor module 340. When the processor 310 is in a sleep mode, the processor 310 may control the sensor module 340.

For example, the input unit 350 may include a touch panel 352, a (digital) pen sensor 354, a key 356, or an ultrasonic input unit 358. For example, the touch panel 352 may use at least one of a capacitive method, a resistive method, an infrared method, or an ultrasonic method. In addition, the touch panel 352 may further include a control circuit. The touch panel 352 may further include a tactile layer to provide a tactile sense to a user.

For example, the (digital) pen sensor 354 may be a part of the touch panel 352 or may include a separate sensing sheet. For example, the key 356 may include a physical button, an optical key, or a keypad. The ultrasonic input unit 358 may detect ultrasonic waves generated from an input tool by using a microphone (such as a microphone 388) and may check data corresponding to the ultrasonic waves.

The display 360 may include a panel 362, a hologram device 364, or a projector 366. The structure of the panel 362 may be the same as or similar to the structure of the display 260 illustrated in FIG. 7. For example, the panel 362 may be flexible, transparent, or wearable. The panel 362 and the touch panel 352 may be provided as a single module. According to an embodiment, the panel 362 may include a pressure sensor (or a force sensor) capable of sensing the magnitude of touching pressure by a user. The pressure sensor may be provided as part of the touch panel 352, or at least one pressure sensor may be provided separately from the touch panel 352. The hologram device 364 may display three-dimensional images in a space by using interference of light. The projector 366 may display images by projecting light onto a screen. For example, the screen may be located inside or outside the electronic apparatus 301. According to an embodiment, the display 360 may further include a control circuit to control the panel 362, the hologram device 364, or the projector 366.

For example, the interface 370 may include an HDMI 372, a USB 374, an optical interface 376, or a D-subminiature (D-sub) 378. For example, the interface 370 may include the communication interface 270 illustrated in FIG. 7. Additionally or alternatively, the interface 370 may, for example, include a mobile high-definition link (MI-IL) interface, an SD card/MMC interface, or an infrared data association (IrDA) interface.

For example, the audio module 380 may convert sounds into electric signals, and electric signals into sounds. For example, at least one element of the audio module 380 may include the input/output interface 250 illustrated in FIG. 7. For example, the audio module 380 may process sound information that is input through or will be output through a speaker 382, a receiver 384, earphones 386, or the microphone 388.

For example, the camera module 391 may take still images and videos. According to an embodiment, the camera module 391 may include at least one image sensor (for example, a front image sensor or a rear image sensor), a lens, an ISP, or a flash (for example, an LED or a xenon lamp). For example, the camera module 391 may include any one of the optical lens assemblies of the various embodiments.

For example, the power management module 395 may manage power of the electronic apparatus 301. The electronic apparatus 301 may receive power from the battery 396. However, the electronic apparatus 301 is not limited to receiving power from the battery 396. According to an embodiment, the power management module 395 may include a power management integrated circuit (PMIC), a charger integrated circuit (IC), or a battery or fuel gauge. The PMIC may use a wired and/or wireless charging method. For example, the wireless charging method may include a magnetic resonance method, a magnetic induction method, or an electromagnetic wave method, and an additional wireless charging circuit such as a coil loop, a resonance circuit, or a rectifier may be used. For example, the battery or fuel gauge may measure the amount of electricity remaining in the battery 396 and the voltage, current, or temperature of the battery 396 during a charging operation. For example, the battery 396 may include a rechargeable battery and/or a solar battery.

The indicator 397 may display a particular state such as a booting state, a messaging state, or a charge state of the electronic apparatus 301 or a part of the electronic apparatus 301 (such as the processor 310). The motor 398 may convert an electric signal into a mechanical vibration and may produce a vibrational or haptic effect. The electronic apparatus 301 may include a processing device (such as a GPU) to support a mobile TV service. The processing unit for a mobile TV service may process media data according to a standard such as digital multimedia broadcasting (DMB), digital video broadcasting (DVB), or mediaFlo™.

According to various embodiments, an optical lens assembly includes: a first lens having a convex object-side surface; a second lens having a convex object-side surface; at least one lens at an image side of the second lens; a first stop being a variable stop at an object side of the first lens; and a second stop between an image side of the first stop and the at least one lens at the image side of the second lens, wherein the second stop determines a minimum F number, and the first stop is variable to determine an F number greater than the minimum F number, wherein the optical lens assembly satisfies the following conditions:

$$\frac{|d2|}{|sag1|} \le 0.9 \qquad \text{⟨Conditions⟩}$$

$$0.2 \le \frac{R1}{f} \le 0.8$$

where sag1 denotes a sag value of the object-side surface of the first lens measured based on an effective diameter at the minimum F number, d2 denotes a distance measured from a vertex of the object-side surface of the first lens to the first stop along an optical axis, R1 denotes a radius of curvature of the object-side surface of the first lens, and f denotes a total focal length of the optical lens assembly.

For example, the optical lens assembly may satisfy the following condition:

$$0.4 < \frac{Fno1}{Fno2} < 0.8 \qquad \text{⟨Condition⟩}$$

where Fno1 denotes the minimum F number of the second stop, and Fno2 denotes an F number when the first stop is in a variably opened state.

For example, the optical lens assembly may further include an image sensor, wherein the optical lens assembly may satisfy the following condition:

$$1.0 < \frac{TT}{Y_{IH}} < 1.8 \qquad \text{⟨Condition⟩}$$

where TT denotes a distance from the first stop to the image sensor along the optical axis, and $Y_{IH}$ denotes half a diagonal length of the image sensor.

For example, the optical lens assembly may further include an image sensor, wherein the optical lens assembly may satisfy the following condition:

$$0 < \frac{t21}{Y_{IH}} < 1.0 \qquad \text{⟨Condition⟩}$$

where t21 denotes a distance from the first stop to the second stop along the optical axis, and $Y_{IH}$ denotes half a diagonal length of the image sensor.

For example, the optical lens assembly may further include an image sensor, wherein the optical lens assembly may satisfy the following condition:

$$0.1 < \frac{s2}{Y_{IH}} < 0.5 \qquad \text{⟨Condition⟩}$$

where s2 denotes a radius of the first stop at its maximum F number, and $Y_{IH}$ denotes half a diagonal length of the image sensor.

For example, the optical lens assembly may satisfy the following condition:

$$0.4 < \frac{f}{f2} < 1.6 \qquad \text{⟨Condition⟩}$$

where f2 denotes a focal length of the second lens.

For example, the optical lens assembly may further include a third lens at the image side of the second lens, and the third lens may have negative refractive power and a concave image-side surface.

For example, the optical lens assembly may include at least three aspheric plastic lenses.

For example, the optical lens assembly may include at least one aspheric lens having at least one inflection point.

For example, the first lens may have a positive refractive power.

For example, the first lens may have a meniscus shape.

For example, when the optical lens assembly is focused, the first stop and the second stop may be moved together with the first lens, the second lens, and the at least one lens at the image side of the second lens.

For example, the second stop may be provided between the first lens and the second lens or provided at the image side of the second lens.

According to various embodiments, an optical lens assembly may include: at least five lenses arranged between an object and an image plane; a variable stop provided at an object side of a lens closest to the object among the at least five lenses; and a fixed stop provided between an image side of the variable stop and an image-side surface of a third lens from the object, wherein the fixed stop may determine a first F number for a maximum aperture, and the variable stop may be moved to adjust a second F number greater than the first F number, wherein, during a focusing operation, the variable stop and the fixed stop may be moved together with the at least five lenses.

According to various embodiments, a method of forming an image using an optical lens assembly including a plurality of lenses may include: allowing a first lens closest to an object among the plurality of lenses to receive light; adjusting a first F number by moving a first stop provided at an object side of the first lens; determining a second F number for a maximum aperture by using a second stop provided between an image side of the first stop and an image-side surface of a third lens from the object among the plurality of lenses; and adjusting an amount of the received light by using the first and second stops.

For example, the first stop may be a variable stop, and the second stop may be a fixed stop.

For example, when the optical lens assembly is focused, the first and second stops may be moved together with the plurality of lenses.

In the present disclosure, each of the above-described elements may be configured with one or more components, and the names of the elements may vary based on the types of electronic apparatuses. According to embodiments, the electronic apparatus may include at least one of the aforementioned elements. Some elements may be omitted or other additional elements may be further included in the electronic apparatus. Furthermore, in some embodiments, some elements of the electronic apparatus may be combined as one entity, which may have the same functions as those of the elements.

The term "module" used in this disclosure may refer to a unit including, for example, one of hardware, software, firmware or any combination thereof. For example, the term "module" may be interchangeable with a term such as unit, logic, logical block, component, or circuit. A module may be formed mechanically or electronically. For example, a module may include at least one of a application-specific integrated circuit (ASIC) chip, a field-programmable gate array (FPGAs), or a programmable-logic device which have been known or are to be developed.

According to an embodiment, at least a portion of an apparatus (e.g., modules or functions thereof) or a method (e.g., operations), for example, may be implemented as instructions stored in a computer-readable storage medium in the form of a programmable module. When the instructions are executed by one or more processors (e.g., the processor 220 illustrated in FIG. 7), the one or more processors may perform functions corresponding to the instructions. The computer-readable storage medium, for example, may be the memory 230.

A computer-readable recording medium may include a hard disk, a floppy disk, a magnetic medium (e.g., a magnetic tape), an optical medium (e.g., a compact disc read only memory (CD-ROM), a digital versatile disc (DVD), a magneto-optical media (e.g., a floptical disk), and a hardware device (e.g., read only memory (ROM), random access memory (RAM), or flash memory). Also, a program instruction may include not only machine language code such as those generated by a compiler but also high-level language code executable on a computer using an interpreter, etc. The above-mentioned hardware device may be configured to operate via one or more software modules to perform operations according to embodiments, and vice versa. A module or a programming module according to an embodiment may include at least one of the above-described elements, or a portion of the above-described elements may be omitted, or additional other elements may be further included. Operations performed by a module, a programming module, or other elements according to an embodiment of the present disclosure may be executed sequentially, in parallel, repeatedly, or in a heuristic method. Also, some operations may be executed in different sequences or may be omitted, or other operations may be added. It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An optical lens assembly comprising:
a first lens having a convex object-side surface;
a second lens having a convex object-side surface;
at least one lens at an image side of the second lens;
a first stop being a variable stop at an object side of the first lens; and
a second stop between an image side of the first stop and the at least one lens at the image side of the second lens,
wherein the second stop determines a minimum F number, and the first stop is variable to determine an F number greater than the minimum F number,
wherein the optical lens assembly satisfies the following conditions:

$$\frac{|d2|}{|sag1|} \leq 0.9 \quad \langle\text{Conditions}\rangle$$

$$0.2 \leq \frac{R1}{f} \leq 0.8$$

where sag1 denotes a sag value of the object-side surface of the first lens measured based on an effective diameter at the minimum F number, d2 denotes a distance measured from a vertex of the object-side surface of the first lens to the first stop along an optical axis, R1 denotes a radius of curvature of the object-side surface of the first lens, and f denotes a total focal length of the optical lens assembly.

2. The optical lens assembly of claim 1, wherein the optical lens assembly satisfies the following condition:

$$0.4 < \frac{Fno1}{Fno2} < 0.8 \quad \langle\text{Condition}\rangle$$

where Fno1 denotes the minimum F number of the second stop, and Fno2 denotes an F number when the first stop is in a variably opened state.

3. The optical lens assembly of claim 1, further comprising an image sensor, wherein the optical lens assembly satisfies the following condition:

$$1.0 < \frac{TT}{Y_{IH}} < 1.8 \quad \langle\text{Condition}\rangle$$

where TT denotes a distance from the first stop to the image sensor along the optical axis, and $Y_{IH}$ denotes half a diagonal length of the image sensor.

4. The optical lens assembly of claim 1, further comprising an image sensor, wherein the optical lens assembly satisfies the following condition:

$$0 < \frac{t21}{Y_{IH}} < 1.0 \quad \langle\text{Condition}\rangle$$

where t21 denotes a distance from the first stop to the second stop along the optical axis, and $Y_{IH}$ denotes half a diagonal length of the image sensor.

5. The optical lens assembly of claim 1, further comprising an image sensor, wherein the optical lens assembly satisfies the following condition:

$$0.1 < \frac{s2}{Y_{IH}} < 0.5 \quad \langle\text{Condition}\rangle$$

where s2 denotes a radius of the first stop at its maximum F number, and $Y_{IH}$ denotes half a diagonal length of the image sensor.

6. The optical lens assembly of claim 1, wherein the optical lens assembly satisfies the following condition:

$$0.4 < \frac{f}{f2} < 1.6 \quad \langle\text{Condition}\rangle$$

where f2 denotes a focal length of the second lens.

7. The optical lens assembly of claim 1, wherein the at least one lens at the image side of the second lens includes a third lens at the image side of the second lens, the third lens having negative refractive power and a concave image-side surface.

8. The optical lens assembly of claim 1, wherein the optical lens assembly comprises at least three aspheric plastic lenses.

9. The optical lens assembly of claim 1, wherein the optical lens assembly comprises at least one aspheric lens having at least one inflection point.

10. The optical lens assembly of claim 1, wherein the first lens has positive refractive power.

11. The optical lens assembly of claim 1, wherein the first lens has a meniscus shape.

12. The optical lens assembly of claim 1, wherein, when the optical lens assembly is focused, the first stop and the second stop are moved together with the first lens, the second lens, and the at least one lens at the image side of the second lens.

13. The optical lens assembly of claim 1, wherein the second stop is provided between the first lens and the second lens or provided at the image side of the second lens.

\* \* \* \* \*